J. G. ANTHONY.
AUTOMOBILE SIGNAL.
APPLICATION FILED OCT. 17, 1917.
1,285,549.
Patented Nov. 19, 1918.
2 SHEETS—SHEET 2.
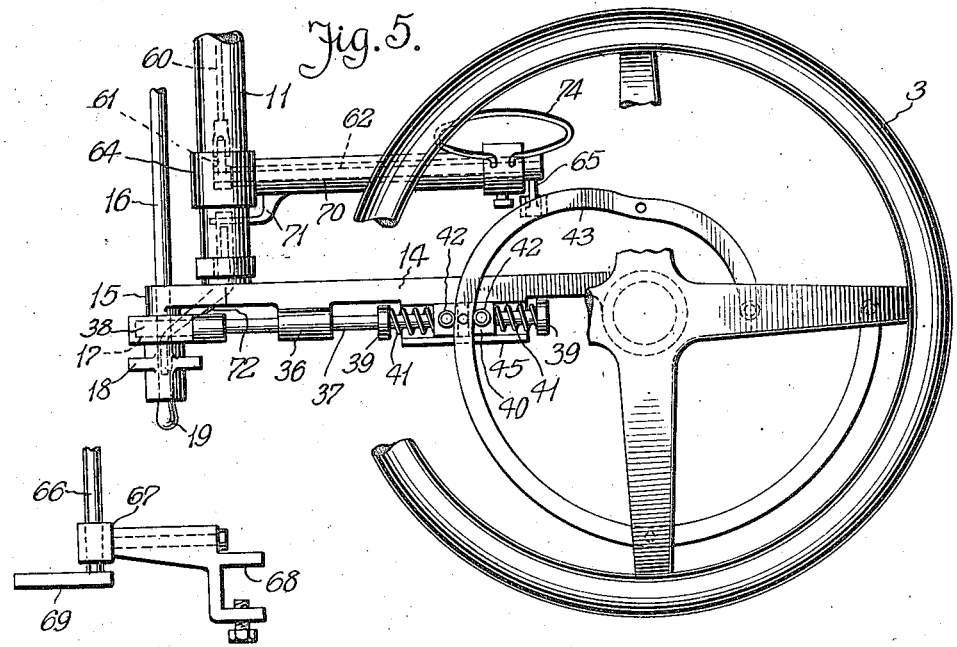
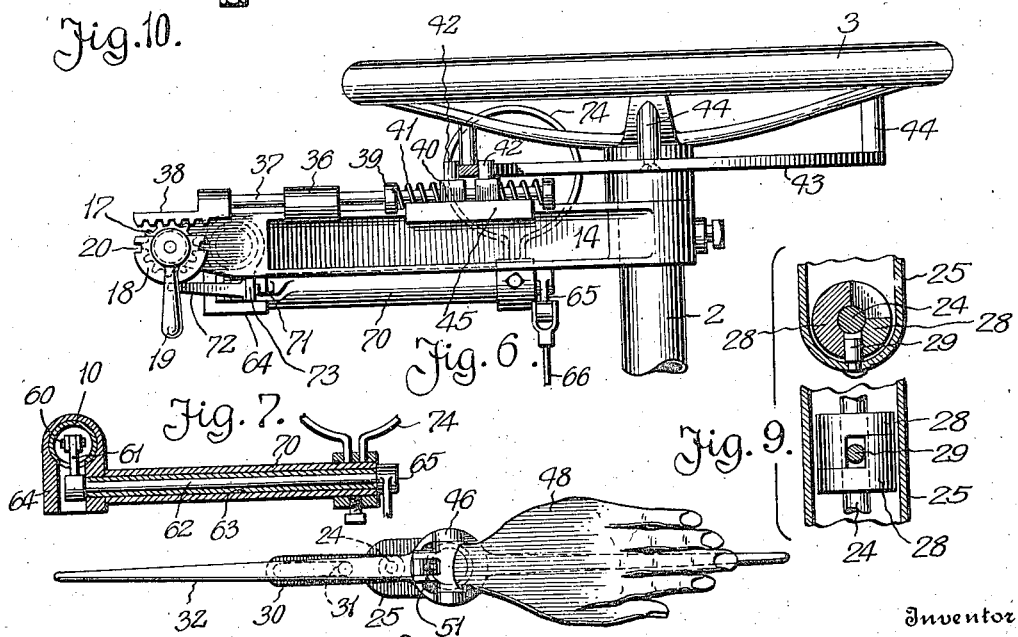
Witness
Chas. W. Stauffiger
Karl H. Butler
Inventor
Joseph G. Anthony,
By
Attorneys

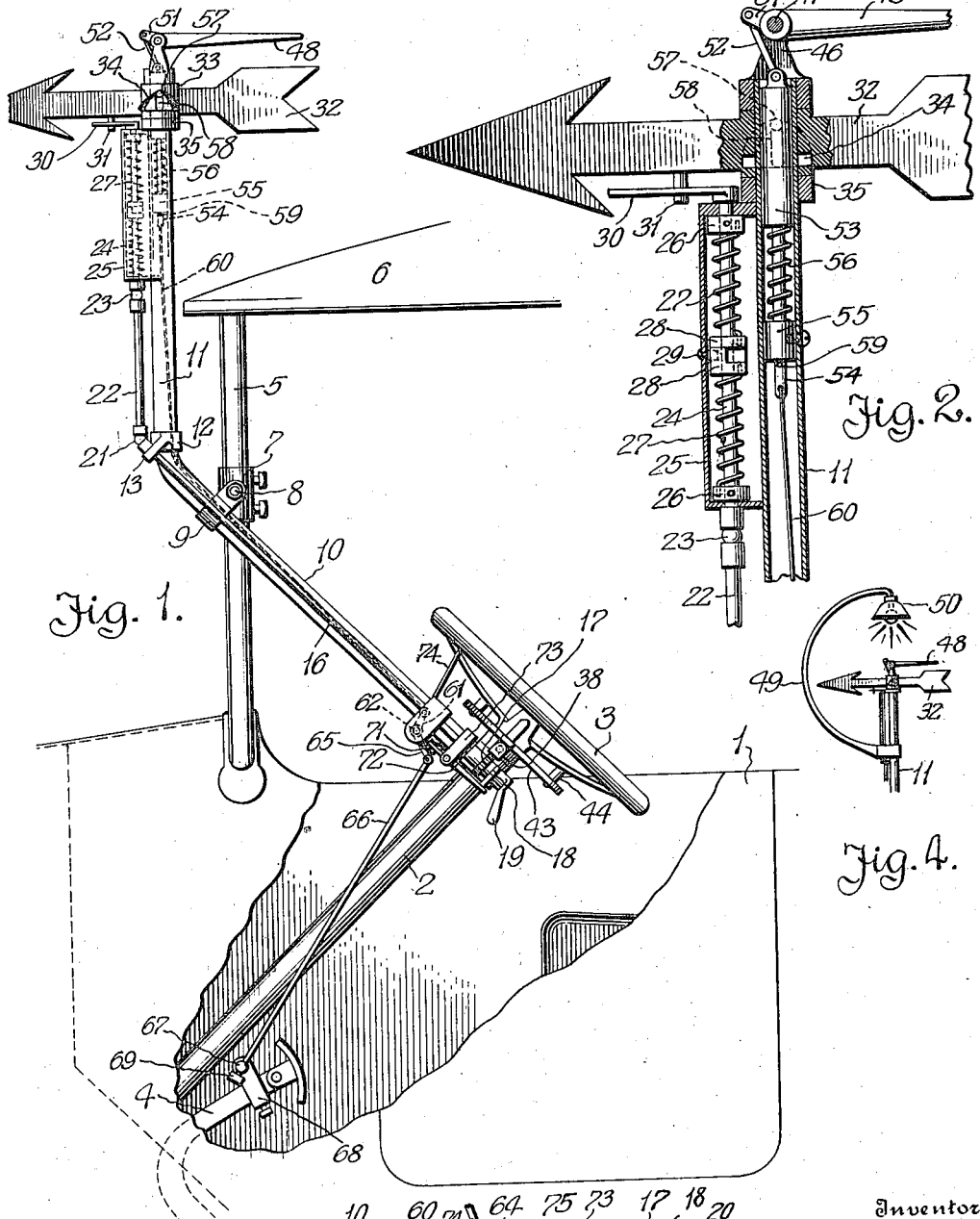

UNITED STATES PATENT OFFICE.

JOSEPH G. ANTHONY, OF DETROIT, MICHIGAN.

AUTOMOBILE-SIGNAL.

1,285,549. Specification of Letters Patent. Patented Nov. 19, 1918.

Application filed October 17, 1917. Serial No. 197,039.

*To all whom it may concern:*

Be it known that I, JOSEPH G. ANTHONY, a citizen of the United States of America, residing at Detroit, in the county of Wayne and State of Michigan, have invented certain new and useful Improvements in Automobile-Signals, of which the following is a specification, reference being had therein to the accompanying drawings.

This invention relates to signals for automobiles, and has special reference to a signal that will facilitate traffic at the intersections of streets or roads, and will reduce collisions and accidents to a minimum if the signals are obeyed.

The primary object of my invention is to furnish an automobile with signals that may be automatically actuated by the turning of the steering wheel of the automobile, the signals including a horizontal oscillatory member to indicate direction of travel, and a warning member adapted to be swung from a horizontal to a vertical position to indicate that the signal carrying automobile is about to stop, slow down, or turn into a lane of travel indicated by the first mentioned member, both of said members being designed to attract attention and capable of being illuminated for use at night.

Another object of my invention is to provide a direction indicator for automobiles that may be manually operated by hand or automatically by the steering wheel of an automobile, the direction indicator also being releasable or restored to normal position through the medium of the steering wheel. This form of direction indicator is preferably an arrow and is maintained normally in a straight ahead direction or position.

A further object of my invention is to provide a warning signal preferably in the form of a hand, that can be swung from a horizontal position to a vertical position, and this signal may be operated in synchronism with another signal or may be operated by the foot or in conjunction with one of the control pedals of the automobile.

A still further object of my invention is to provide a visible signal wherein the parts are constructed with a view of reducing the cost of manufacture and at the same time retain those features by which durability and ease of installation and assembling are secured. With such ends in view my invention resides in the novel construction, combination and arrangement of parts to be hereinafter specifically described and then claimed.

Reference will now be had to the drawings, wherein Figure 1 is a side elevation of a portion of an automobile provided with a signal in accordance with my invention;

Fig. 2 is an enlarged vertical sectional view of a portion of the signal;

Fig. 3 is a longitudinal sectional view of a portion of a tubular support, illustrating a slight modification of the invention;

Fig. 4 is a side elevation of a portion of the signal on a small scale, illustrating one manner of illuminating the same;

Fig. 5 is a plan of a portion of the steering wheel, and that portion of the signal mechanism adjacent thereto;

Fig. 6 is a side elevation of the same;

Fig. 7 is a longitudinal sectional view of a trip member forming part of the signal;

Fig. 8 is a plan of the signal *per se;*

Fig. 9 shows views of spring retainers; and

Fig. 10 is a plan of an attachment for an automobile pedal.

In describing my invention by aid of the views above referred to, I desire to point out that the same are merely illustrative of the signal mechanism as now in use, and I do not care to confine my invention to the precise construction and arrangement of parts shown. The following description is therefore to be broadly construed as including such substitute constructions and arrangements of parts which are the obvious equivalents of those to be hereinafter referred to.

In the drawings, the reference numeral 1 denotes a portion of an automobile body having a steering column or post 2 provided with a steering wheel 3. Adjacent the steering post 2 is a control pedal 4, and attached to the automobile body is a wind shield frame 5 that may assist in supporting a conventional form of top 6.

7 denotes a bearing attached to the side of the wind-shield frame 5 and adjustably connected to said bearing, as at 8 is a hanger 9 for the angularly disposed tubular end 10 of a tubular upright 11. The end 10 extends in proximity to the upper end of the steering post 2 and the upright 11 extends above the plane of the top 6. The upright 11 and its angular end may be made of tubing or sections of pipes connected together, as at 12, with said connection providing a bearing 13. The upright 11 may be supported wholly by the hanger 9, but as shown, the angular end 10 extends into a bracket 14 attached to the upper end of the steering post 2, below the steering wheel 3. The outer end of the bracket 14 affords a bearing 15 for a shaft 16 which is disposed in parallelism to the angular end 10 of the upright 11 and has the upper end thereof journaled in the bearing 13. On the lower end of the shaft 16 is fixed a pinion 17, a quadrant member 18, and a small crank 19, said quadrant member having diametrically opposed notches 20.

The upper end of the shaft 16 has a universal joint 21 connected to a shaft 22 disposed in parallelism with the upright 11, and said shaft has a universal connection 23 with a shaft 24 extending through a casing 25 carried by the upper end of the upright 11. On the upper and lower ends of the shaft 24, within the casing 25, are fixed collars 26 and surrounding said shafts are coiled retractile springs 27 having the end convolutions thereof mounted in the collars 26. Other end convolutions of said springs are fixed in retaining members 28 loose on the shaft 24 and normally engaging a pin 29 extending inwardly from the casing 25. As best shown in Fig. 9, the retaining members 28 are in confronting relation and are cut away to fit together, each member being held in engagement with the pin 29, by the springs 27, and with said members cut away, each member will have a defined movement relatively to the pin 29. One of the retaining members 28 will permit of the shaft 24 being turned in a clockwise direction just so far, and the other retaining member serves the same purpose for a counterclockwise movement of said shaft.

On the upper outer end of the shaft 24 is a crank 30 adapted to engage a depending pin 31, carried by a horizontal oscillatory member 32 that will be hereinafter referred to as an arrow as said member is adapted to indicate direction of travel of the automobile. The arrow 32 may be made hollow with perforated side walls and illuminating means may be located within the arrow. It is also possible to cast the same from heavy translucent glass and place an electric light therein so that the arrow will be luminous at night.

The arrow has a central hub portion 33 providing opposed cam surfaces 34 and the hub portion 33 is journaled on the upper end of the upright 11 and rests upon a collar 35 provided therefor.

By manually operating the crank at the lower end of the shaft 16, the arrow 32 may be swung in a desired direction, and one or the other of the springs 27, will restore said arrow to normal straight ahead position.

To operate or shift the arrow 32 automatically and in synchronism with the turning of the steering wheel 3, the bracket 14 is provided with a bearing 36 for a rod 37 that is reciprocable within the bearing 36 and has the outer end thereof provided with a rack 38 meshing with the pinion 17. The inner end of the rod 37 has fixed collars 39, and slidable upon said rod between the collars 39 are heads 40. The heads 40 are disposed in close proximity with coiled compression springs 41 encircling the rod, between said heads and the collars 39 and the tension of said springs is sufficient to retain studs 42 on the heads 40 in engagement with the side edges of a cam member 43. This cam member is supported below the steering wheel 3 and by pins 44 depending from the spokes of said steering wheel.

The heads 40 are slidable in guides 45 on the side of the bracket 48 and when the steering wheel 3 is partially rotated to steer the automobile, the member 43 engaging the studs 42 causes the rod 37 to be shifted in one direction or the other through the medium of the collars 39 and springs 41. Reciprocation of the rod 37 causes the rack 38 to partially rotate the pinion 17, consequently the arrow 32 will be shifted to indicate the direction in which the automobile is made to steer by the operator or chauffeur manipulating the steering wheel 3.

When the arrow 32 is shifted through the medium of the small crank 19, the rod 37 is reciprocated in its bearing and one or the other of the springs 41 is placed under tension without shifting the heads 40, said heads and the springs constituting yieldable connections between the cam 43 of the steering wheel 3 and the shaft 16.

Again referring to the upright 11, the extreme upper end of this upright has a bifurcated or forked bearing 46 and pivotally mounted therein on a pin 47 is a member 48 adapted to swing in a vertical plane, from a horizontal position to a vertical position. The member 48 serves functionally as a warning signal and is preferably in the form of a hand, and as such will be hereinafter referred to. The hand 48, similar to the arrow 32, may be made of perforated sheet metal and hollow so as to accommodate illuminating means, or it may be made of heavy translucent glass with an incandescent lamp so as to be luminous at night. The illumination of the arrow 32 and the hand 48 is really no part of the subject matter of this application, but as illustrating a conventional form of illumination there is shown in Fig. 4, a bracket 49 carried by the upper end of the upright 11 and extending upwardly in front of the arrow 32 and over the hand 48, said bracket having a reflector and incandescent lamp generally denoted 50. The reflector and lamp casts rays of light on to the arrow or hand, irrespective of the position of the same, and said lamp may be supplied with electricity from batteries or a suitable source of electrical energy carried by the automobile.

The hand 48 has a small crank 51 connected by a link 52 to the upper end of a plunger 53 slidable in the upper end of the upright 11 and said plunger has a reduced end 4 extending through a guide 55 in said upright, with a coiled compression spring 56 encircling the reduced end, below the plunger, to hold the hand 48 normally lowered in a horizontal position, as best shown in Fig. 2.

The upper end of the plunger 53 has outwardly extending lateral pins 57 protruding through slots 58 provided therefor in the upright 11, so that the cam surfaces 34 of the arrow hub portion 33 may engage the lateral pins 57 and cause the plunger 53 to be lowered when the arrow 32 is actuated. The hand 48 will thus attract attention to the arrow and the operators or chauffeurs of other machines may readily determine the direction in which the signal carrying automobile is about to turn.

The normal elevated position of the plunger 53 is defined by a stop 59 on the reduced end 54 of said plunger and the reduced end of said plunger is connected by a flexible rod or shaft 60 to a crank 61 adjacent the lower end of the upright 11 said flexible shaft or rod extending through the upright 11 and its angular end 10. The crank 61 is mounted on the inner end of a shaft 62 journaled in a tubular bearing 63 carried by a band or connection 64 on the angular end 10 of the upright 11. This is best shown in Fig. 7, where it will be observed that the outer end of the shaft 62 has a crank 65 pivotally connected to a reach rod 66 that extends downwardly at the side of the steering post 2. The reach rod 66 extends through a swiveled bearing 67 carried by an attachment or bracket 68 of the control pedal 4, said bracket being detachably connected to said control pedal. At the extreme lower end of the reach rod 66 is a tread piece 69, and this tread piece permits of the reach rod 66 being actuated independent of the control pedal 4. The control pedal 4, when actuated, moves somewhat in an arc, so the swivel 67 is necessary and when the control 4 or the tread piece 69 are depressed, the reach rod 66 rocks the shaft 62 and shifts the flexible rod 60 in the upright 11, to lower the plunger 63 and raise the hand 48. It is now apparent that besides the hand 48 being operatable through the medium of the arrow 32, that the hand may be operated in synchronism with the control pedal 4 by the pressure of the foot on the pedal, also by pressure of the foot on the tread piece 69, without effecting an operation of the control pedal.

On the tubular bearing 63 is a rock sleeve 70 and on the inner end of said rock sleeve is a crank 71 that extends under a fulcrum lever 72, carried by a band or bearing 73 on the angular end 10 of the upright 11. The lever 72 is adapted to engage in one of the notches 20 of the quadrant member 18 and lock the shaft 16 in an adjusted position, thus preventing the arrow 32 or the hand 48 from assuming normal position until the quadrant member 18 is released. This is accomplished by providing the outer end of the rock sleeve 70 with an adjustable trip member 74 extending into the path of the spokes of the steering wheel 3. This steering wheel will be turned when rounding a corner and the initial movement of the wheel is adapted to actuate the arrow 32 and the hand 48, providing the quadrant member 18 is not locked by the fulcrum lever 72. If said quadrant member should be locked, the steering wheel 3 can be still turned as the springs 41 will allow the heads 40 to yield, and in this manner the cam 43 will not reciprocate the rod 37. It is therefore impossible for the operator or chauffeur of an automobile to set the arrow and hand in the middle of a square or when approaching a corner thus displaying the signal in advance. Now when the corner is reached and the hand wheel 3 turned, one of the spokes of the wheel will engage the trip member 74, tilt the lever 72 and release the quadrant member 18, and the shafts 16, 22 and 24 may then assume normal position with the arrow 32 and the hand 48 restored to normal position.

In Fig. 3 there is illustrated a slight modification of my invention wherein the shaft 16 extends into the angular end 10 of the upright 11 and is disposed concentric thereof, with its adjusting means on the lower end of the upright. In view of such arrangement it is necessary that a forked or bifurcated crank 75 be placed in the lower end of the upright for attachment to the flexible rod 60 and to provide clearance for the shaft 16.

What I claim is:—

1. In a signal, an upright adapted for attachment to an automobile and having its lower end extending in proximity to the steering post of the automobile and the steering wheel of said post and its upper end adapted to support a horizontal signal member, and means operatable at the lower end of said upright adapted for oscillating the horizontal signal member on said upright, said means comprising a bracket on said steering post, a rock shaft in the outer end thereof adapted for moving the signal member, a pinion on said shaft, a rack engaging said pinion, and a cam supported from said steering wheel and adapted to reciprocate said rack.

2. In a signal, a signal supporting upright adapted for attachment to an automobile and having its lower angular end extending in proximity to the steering post of the automobile and the steering wheel on said post, and means operatable at the angular ends of said upright adapted for oscillating a signal on said upright, said means comprising a bracket on said steering post, a rock shaft in the outer end thereof adapted for moving the signal on the upright, a pinion on said shaft, a rack engaging said pinion, a cam supported from said steering wheel and adapted to reciprocate said rack, a crank on the end of said rock shaft so that said shaft may be manually actuated, and a yieldable connection between said rack and said cam permitting of said shaft being actuated by said crank independent of said cam.

3. The combination with an automobile having a steering post, a steering wheel and a control pedal, of an upright adapted for attachment to the automobile, and having the lower end thereof in proximity to said steering wheel, and the upper end adapted for supporting signal members, means operatable by the turning of said steering wheel adapted for osciallating one of the signal members on said upright, and means attached to said control pedal and extending through said upright adapted for operating the other signal member on said upright, said means being operatable either in synchronism with said control pedal or independent thereof.

4. The combination with an automobile having a steering post, a steering wheel, and a control pedal, of an upright adapted for attachment to the automobile and having the lower end thereof in proximity to said steering wheel and the upper end adapted for supporting signal members, means along said upright and operatable by the turning of said steering wheel adapted to effect an oscillatory movement of one of the members on said upright, a vertical signal member on said upright above said horizontal signal member, means actuated by an adjustment of one of the signal members adapted to effect an operation of the other signal members, and means attached to said control pedal and extending through said upright adapted to oscillate one of the signal members independent of the other signal member of said upright.

5. In a signal, the combination with an automobile having a steering post, a steering wheel, vertical and horizontal signal members, and a control pedal, of an upright adapted for attachment to said automobile and adapted to support said horizontal and vertical signal members, means including springs, shafts and a cam member, the latter carried by said steering wheel for effecting an adjustment of the horizontal signal member, and means attached to said control pedal and extending through said upright adapted for adjusting the vertical signal member of said upright.

6. The combination with an automobile having a steering post, a steering wheel, signal members, and a control pedal, of an upright adapted for attachment to an automobile having the lower end thereof in proximity to the said steering wheel and its upper end supporting said signal members, means operatable by the turning of said steering wheel and including a cam, shafts and springs adapted for adjusting one of said signal members, means attached to said control pedal and extending through said upright adapted for adjusting one signal member independent of the other signal member, means adapted for locking said signal members in adjusted positions, and means actuated by the turning of said steering wheel adapted to release said locking means.

In testimony whereof I affix my signature in the presence of two witnesses.

JOSEPH G. ANTHONY.

Witnesses:
ANNA M. DORR,
LEWIS E. FLANDEN.